(12) United States Patent
Hilt

(10) Patent No.: US 8,764,422 B2
(45) Date of Patent: Jul. 1, 2014

(54) MICROSYSTEMS FOR CONVERTING PRESSURES AND COMPRESSION

(75) Inventor: Thierry Hilt, Barraux (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 81 days.

(21) Appl. No.: 13/321,977

(22) PCT Filed: May 25, 2010

(86) PCT No.: PCT/EP2010/057190
§ 371 (c)(1),
(2), (4) Date: Nov. 22, 2011

(87) PCT Pub. No.: WO2010/136472
PCT Pub. Date: Dec. 2, 2010

(65) Prior Publication Data
US 2012/0068474 A1    Mar. 22, 2012

(30) Foreign Application Priority Data

May 25, 2009   (FR) ..................................... 09 53412

(51) Int. Cl.
| | | |
|---|---|---|
| *H02K 7/18* | (2006.01) | |
| *H05K 7/20* | (2006.01) | |
| *B23P 15/00* | (2006.01) | |
| *F01C 1/063* | (2006.01) | |
| *F02B 53/00* | (2006.01) | |

(52) U.S. Cl.
USPC .......................... 418/55.3; 290/1 R; 418/55.1

(58) Field of Classification Search
USPC .................... 417/410.3, 410.5; 418/55.1–55.6
See application file for complete search history.

(56) References Cited

U.S. PATENT DOCUMENTS

| | | | |
|---|---|---|---|
| 5,743,720 A * | 4/1998 | Sano et al. .................... | 418/55.5 |
| 5,955,801 A | 9/1999 | Romero et al. | |
| 6,368,065 B1 * | 4/2002 | Hugenroth et al. ............. | 417/53 |
| 2001/0043878 A1 * | 11/2001 | Sullivan et al. .............. | 418/55.4 |
| 2004/0126254 A1 * | 7/2004 | Chen et al. .................. | 417/423.1 |
| 2006/0183015 A1 | 8/2006 | Tseng | |
| 2006/0231237 A1 | 10/2006 | Dangelo | |
| 2008/0202116 A1 * | 8/2008 | Benstead et al. ................ | 60/538 |
| 2009/0028728 A1 * | 1/2009 | Zamudio .................... | 417/410.5 |
| 2010/0058755 A1 * | 3/2010 | Carter ............................ | 60/515 |

FOREIGN PATENT DOCUMENTS

| | | |
|---|---|---|
| EP | 0520271 | 6/1992 |
| FR | 2 700 012 | 7/1994 |
| FR | 2 897 486 | 8/2007 |
| WO | WO 01/25137 | 4/2001 |

(Continued)

*Primary Examiner* — Tulsidas C Patel
*Assistant Examiner* — Sean Gugger
(74) *Attorney, Agent, or Firm* — Occhiuti & Rohlicek LLP

(57) ABSTRACT

The invention relates to a microsystem for converting a difference in pressures in a fluid into mechanical movement, this microsystem comprising: —an inlet nozzle (6) for compressed fluid and an outlet nozzle (8) for expanded fluid, —at least two arms (12, 14), at least one of which is hinged and between which flows the fluid in order to pass from the inlet nozzle to the outlet nozzle by moving these arms with respect to one another, the arms (12, 14) being designed and hinged such that, while they move, they define at least one pocket of fluid which is moved away from the inlet nozzle in order then to return to the outlet nozzle while at the same time increasing in volume, each of the arms (12, 14) being mechanically connected to a single plane (20).

31 Claims, 6 Drawing Sheets

(56) References Cited

FOREIGN PATENT DOCUMENTS

Figure 1:
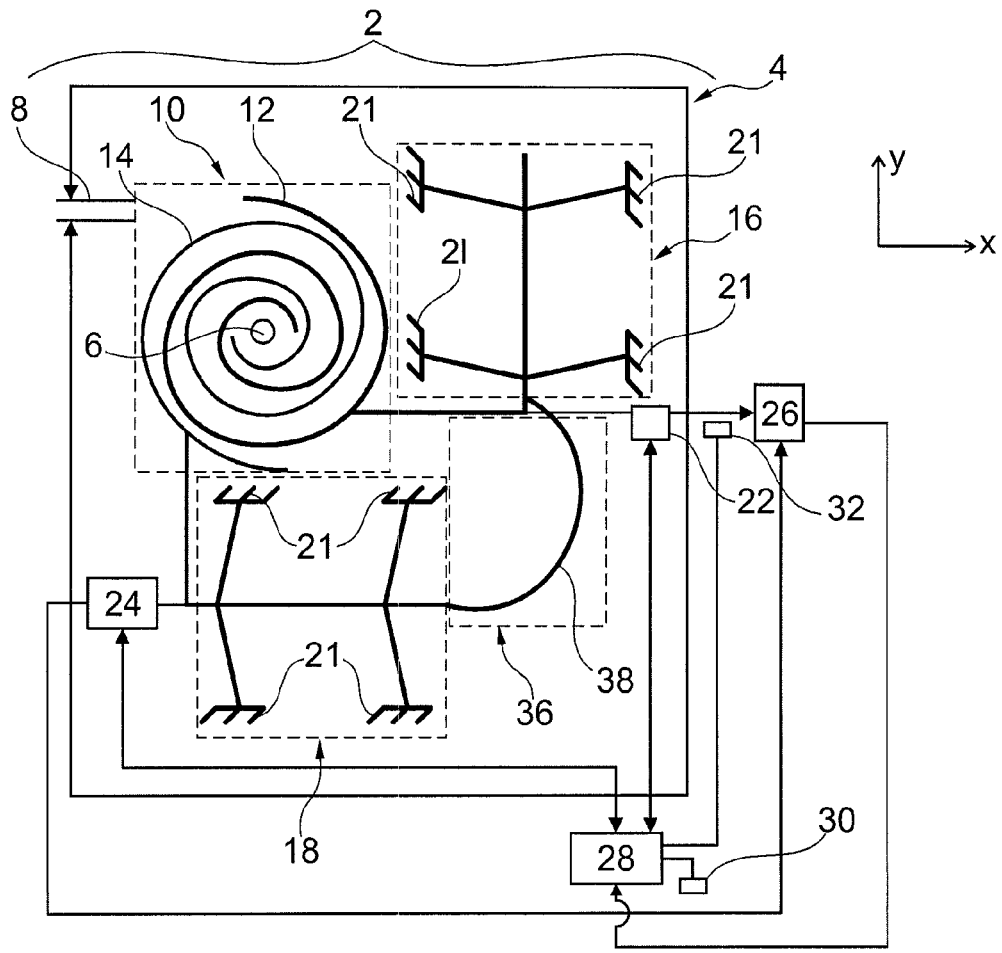

| WO | WO 03/056691 | 7/2003 |
| WO | WO 2006/095039 | 9/2006 |
| WO | WO 2007/082894 | 7/2007 |

* cited by examiner

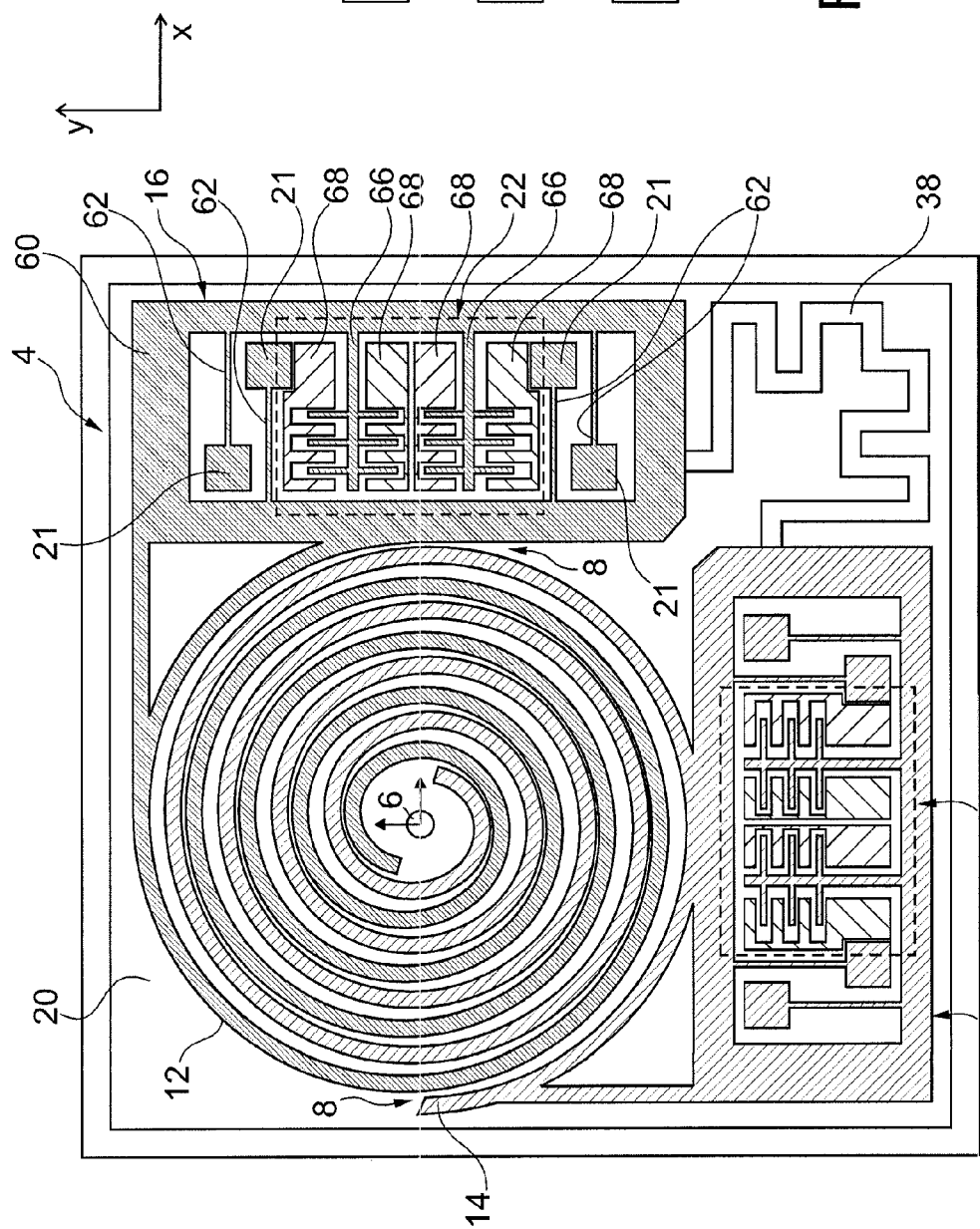

MICROSYSTEMS FOR CONVERTING PRESSURES AND COMPRESSION

CROSS REFERENCE TO RELATED APPLICATIONS

This application is the national stage entry under 35 USC 371 for PCT/EP2010/057190, filed May 25, 2010, which claims the benefit of the May 25, 2009 priority date of French Application No. 0953412. The contents of both the foregoing applications are incorporated herein by reference.

The invention relates to a microsystem for converting pneumatic energy coming from a difference in pressures in a fluid into mechanical movement. It also relates to a microsystem for compressing a fluid. An object of the invention is also a sensor, a wheel, an electronic chip, a micromotor and a fuel cell incorporating one of these systems. Finally, an object of the invention is also a method for manufacturing these microsystems.

The microsystems are for example MEMS (micro-electromechanical systems). These microsystems differ from macroscopic mechanical systems also by their method of manufacture. These microsystems are made by using the same batch manufacturing methods as those used to make microelectronic chips. For example, the microsystems are made with wafers made of monocrystalline silicon or glass machined by photolithography and etching (for example DRIE or deep reactive ion etching) and/or structured by epitaxial growth and deposition of metallic material.

As a result of these manufacturing methods, the microsystems are small and generally have machined parts or portions of parts having at least one dimension of in the micrometer range. The dimension in the micrometer range is generally smaller than 200 µm and goes, for example, from 1 to 200 µm.

For example, ONERA has developed microturbines to convert a liquid flow into mechanical movement. Another microsystem to obtain the same function is disclosed for example in the application WO 03 056 691 or in the application WO 2006/095039.

The disclosed microsystems are capable of converting a difference in pressure into a mechanical motion. However, they have a certain number of drawbacks.

Certain of these microsystems require a rotationally mounted part, generally called a rotor. The rotor rotates relatively to another part that is immobile and is generally called a stator. The rotor is for example a microturbine. Such a rotational motion of the rotor entails losses by friction which may be substantial, thus reducing the energy yield of the microsystem. The term "energy yield" designates the ratio between the mechanical energy produced and the energy provided to the system in the form of a fluidic flow or a difference in pressures.

Furthermore, the making of a microsystem equipped with a rotating part is complex and often requires the stacking of numerous semi-conductor wafers to make its manufacture possible.

Finally, known microsystems achieve high energy efficiency only for high fluid flow rates. On the contrary, for low or very low fluid flow rates, the efficiency deteriorates.

The invention seeks to remedy at least one of these drawbacks.

An object of the invention therefore is a microsystem for converting a difference in pressures into a mechanical movement comprising:
  an inlet nozzle for compressed fluid and an outlet nozzle for expanded fluid,
  at least two arms, at least one of which is movable, between which the fluid flows to pass from the inlet nozzle to the outlet nozzle in moving these arms relatively to each other, these arms being formed and movable so that, during their movement, they define at least one pocket of fluid which moves away from the inlet nozzle and then meets the outlet nozzle while at the same time increasing in volume, each of these arms being mechanically connected to a same plane.

The embodiments of this conversion microsystem may comprise the following characteristic:
  the microsystem comprises at least one transducer capable of converting the mechanical energy produced by the movement of the arms into another energy.

An object of the invention is also a microsystem for compressing a fluid comprising:
  an inlet nozzle for an expanded fluid and an outlet nozzle for compressed fluid,
  at least two arms, at least one of which is movable, between which the fluid flows to pass from the inlet nozzle to the outlet nozzle under the action of a mechanical movement of these arms relatively to one another, these arms being formed and actuated so that, during their movement, they define at least one pocket of fluid which moves away from the inlet nozzle to then come to the outlet nozzle while at the same time getting diminished in volume, each of the arms being mechanically connected to a same plane, and
  at least one actuator capable of moving the arms.

The above microsystems have very high energy efficiency even for very low fluid flow rates.

Furthermore, since the arms define a pocket of fluid that moves away from the inlet nozzle during its movement, it is not necessary to provide for a non-return valve at the inlet nozzle.

Similarly, since the arms define a pocket of fluid that is initially at a distance from the outlet nozzle, it is not necessary either to provide for a non-return valve at the outlet nozzle.

Finally, the fact that the arms are connected to a same plane makes it possible to manufacture the two arms imbricated in each other simultaneously. It is therefore no longer necessary to manufacture the two arms separately and then fit them into each other.

The embodiments of these microsystems may comprise one or more of the following characteristics:
  the arms are formed into spirals imbricated in each other;
  each of the arms is mechanically connected to the same plane by means of a connection enabling only a to-and-fro movement in translation of each arm parallel to the plane and along non-colinear directions;
  the microsystem comprises a mechanical phase-shifter interposed between the two arms to introduce a phase-shift between the to-and-fro movements of these two arms;
  the microsystem comprises:
    at least one link between the arms capable of converting these arms into a system resonating at a resonance frequency, and
    a unit for controlling the mouvements of the arms capable of setting up an automatic feedback control over the frequency of the to-and-fro motions of the arms to slave it to the resonance frequency;
  the link is a spring, each end of which is mechanically connected to one of the arms;
  the microsystem comprises also an upper plane and a lower plane between which the arms are interposed, these planes confining, between these arms, the fluid that flows and the arms being capable of moving relatively to each of the upper and lower planes.

The embodiments of these microsystems furthermore have the following advantages:
- the fact that the arms are moved solely in translation in a same plane simplifies the making of the microsystem since it is not necessary to resort to making numerous stacks of successive semi-conductor wafers,
- the use of a mechanical phase-shifter limits the energy consumption of the microsystem as compared with the case where this phase shift would be obtained only by controlling electromechanical transducers,
- the fact of working at the resonance frequency makes it possible to reduce the energy consumed.

An object of the invention is also a sensor of a difference in pressures between a compressed fluid and an expanded fluid. This sensor comprises:
- the above microsystem for converting a difference in pressure into a mechanical shift, wherein the inlet and outlet nozzles are fluidly connected to the compressed and expanded fluids, and
- a transducer capable of converting the mechanical energy of the movement of the arms under the action of the fluid which expands in flowing from the inlet nozzle to the outlet nozzle, into a physical quantity representing the difference in pressures.

The embodiments of this sensor may include one or more of the following characteristics:
- the transducer is an electromechanical transducer capable of converting the mechanical energy of the movement of the arms into electrical energy used additionally to power the sensor;
- the sensor has a wireless transmitter capable of transmitting a value representing the measured difference in pressures to a remote receiver by means of a wireless link, this transmitter being powered solely with electrical energy produced by the electromechanical transducer.

The embodiments of this sensor moreover have the following advantages:
- the use of an electromechanical transducer, in addition to giving a value representing the measured difference in pressures, makes it possible to power a wireless transmitter.

An object of the invention is also an electronic chip comprising:
- a network of microchannels in which there flows a compressible heat-transfer fluid, these microchannels extending between an inlet opening and an outlet opening in the thickness of the electronic chip in order to cool it, and
- the above microsystem for compression in which the inlet and outlet nozzles are fluidly connected respectively to the inlet opening and the outlet opening of the microchannels, these microchannels forming an expander.

An object of the invention is also a combustion micromotor comprising:
- a channel for the intake of an inflammable mixture of fuel and comburant, and
- at least the above microsystem to compress this mixture before its combustion or to expand exhaust gases resulting from the combustion of this mixture, An object of the invention is also a fuel cell comprising:
- the above micromotor capable of converting the combustion of a mixture of carburant and comburant into a mechanical movement, and
- an electromechanical transducer capable of converting mechanical movement into electrical energy for supplying an electrical load which is connected to the cell.

An object of the invention is also a cell comprising:
- a reservoir of compressed fluid,
- the above microsystem wherein the inlet and outlet nozzles are fluidly connected to the compressed and expanded fluids, this microsystem being capable of converting the expansion of the compressed fluid into a mechanical movement, and
- an electromechanical transducer capable of converting the mechanical movement into electrical energy for powering an electrical load which is connected to the cell.

Finally, an object of the invention is also a method for manufacturing one of the above microsystems, this method comprising the simultaneous deposition on the substrate or the simultaneous etching in a substrate of the arms imbricated with one another.

Figure 2:
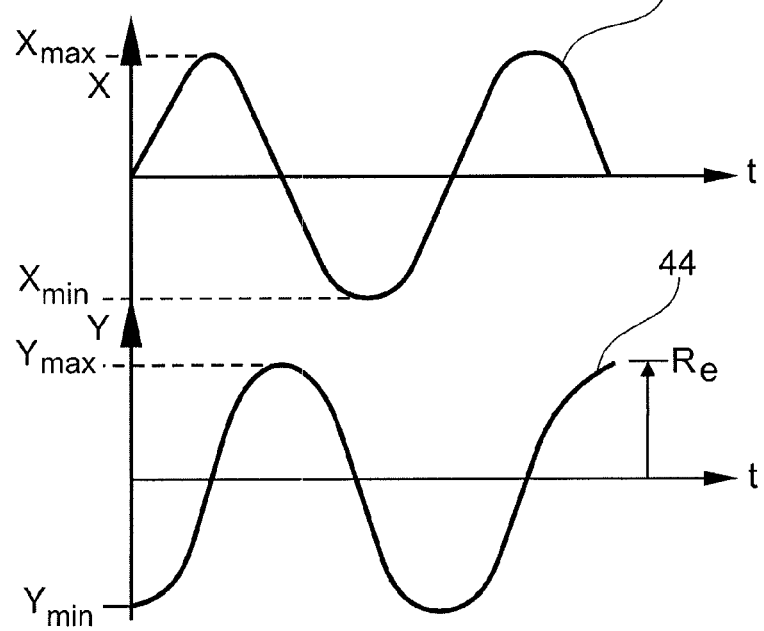
Figure 3:
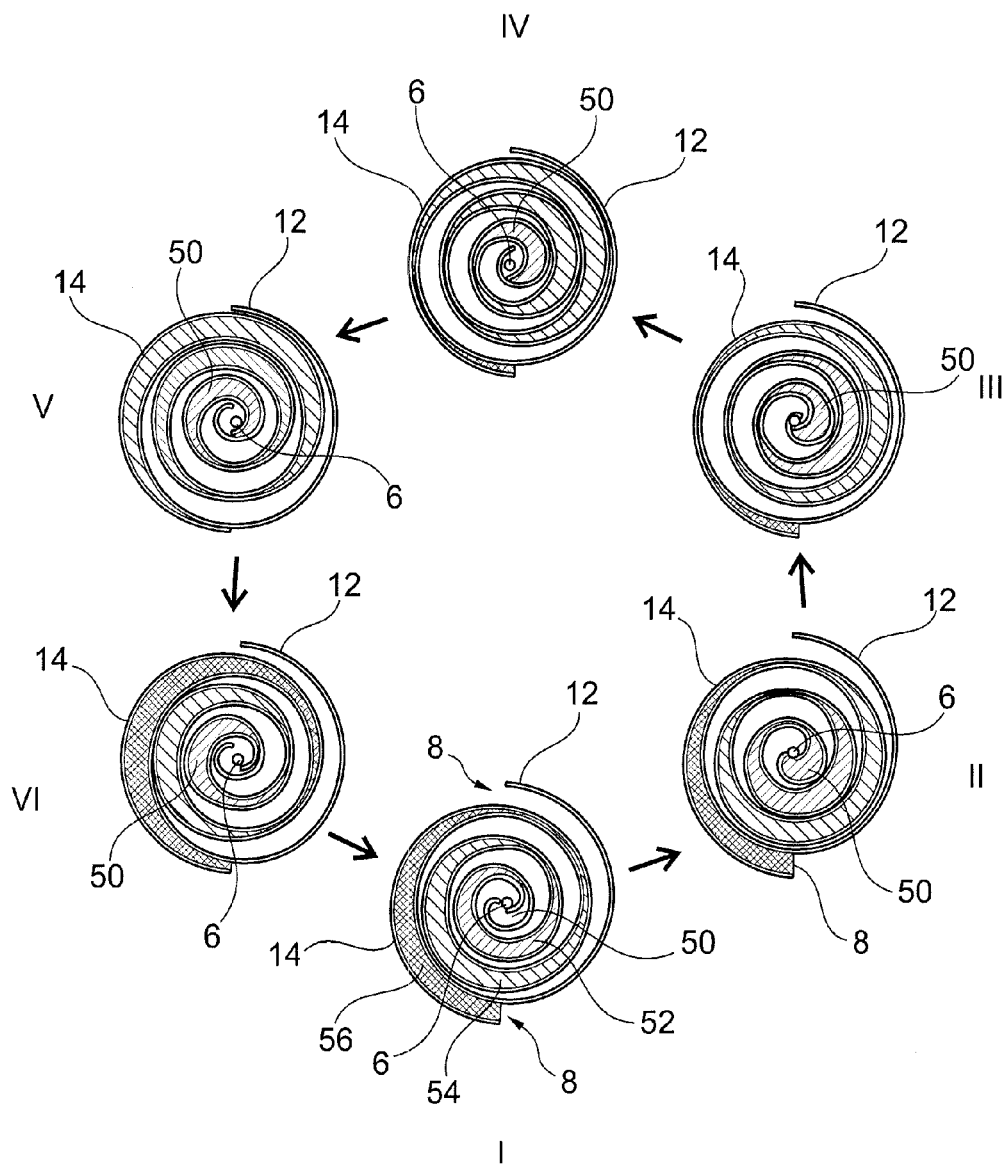
Figure 7:
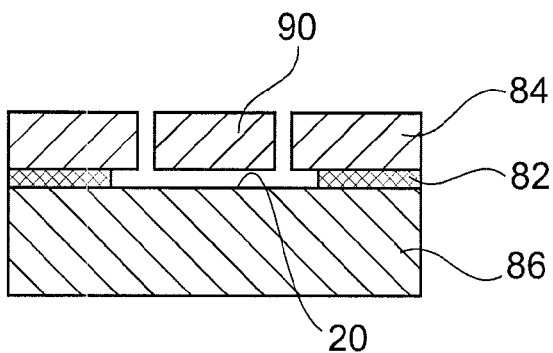
Figure 8:
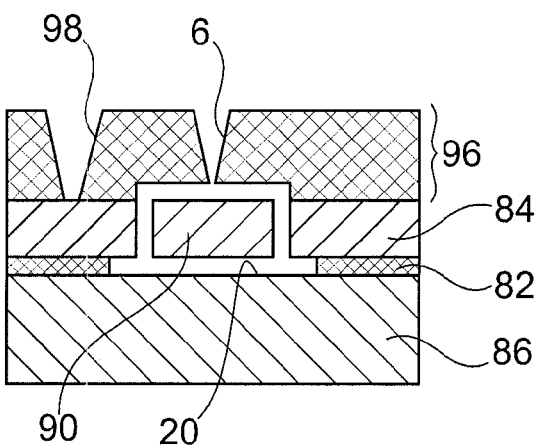
Figure 9:
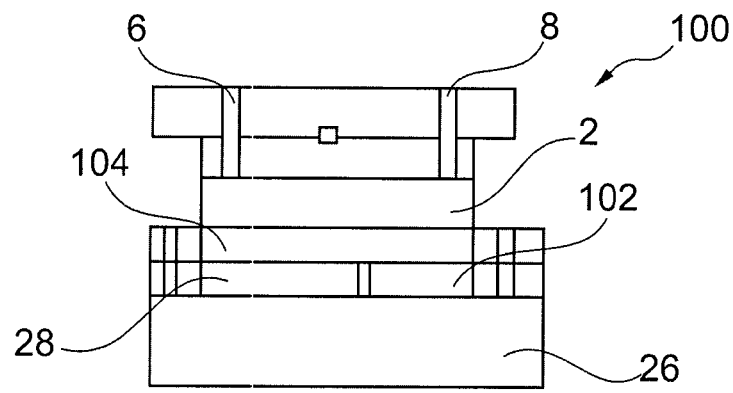
Figure 10:
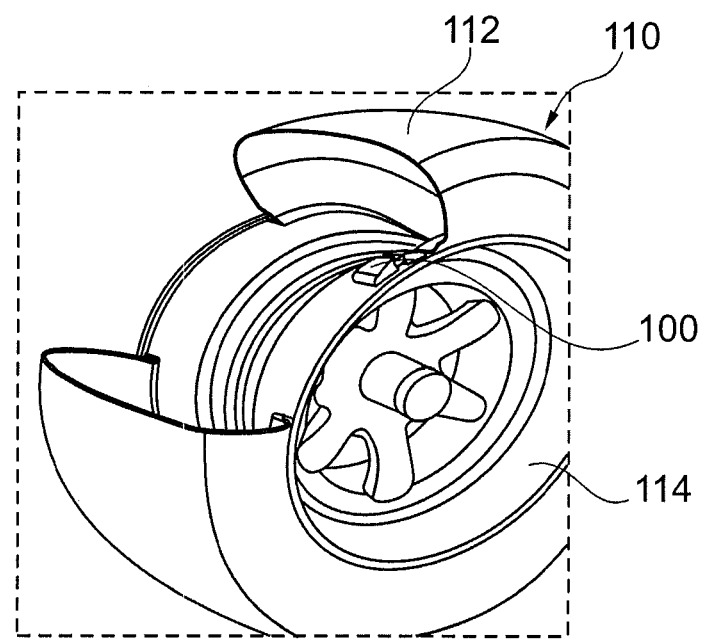
Figure 11:
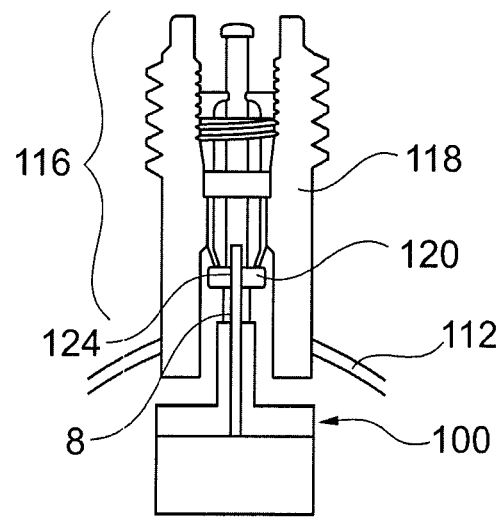
Figure 12:
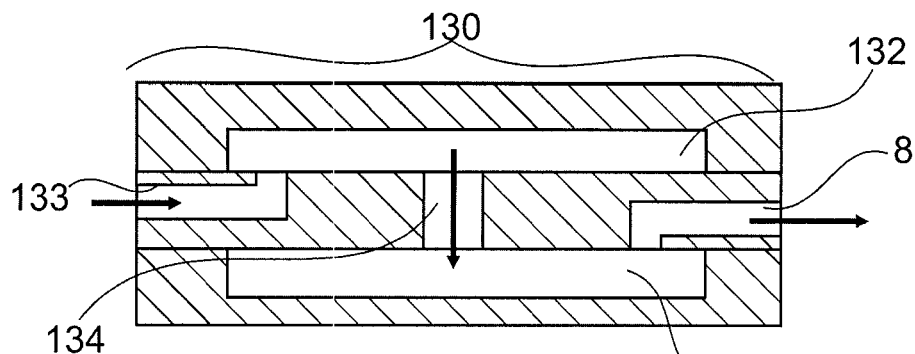
Figure 13:
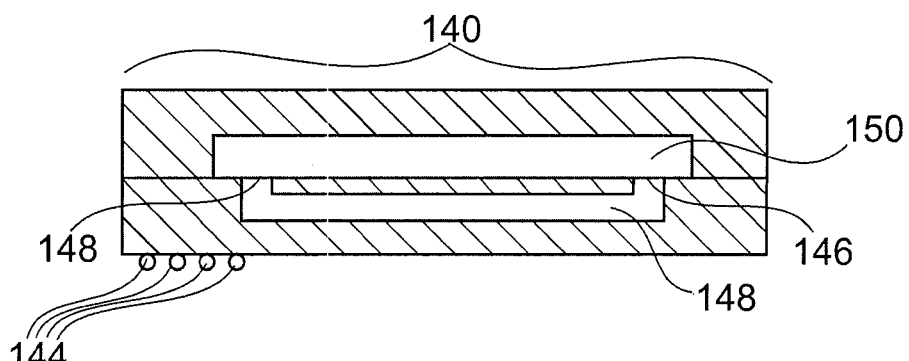

The invention will be understood more clearly from the following description, given purely by way of a non-restrictive example and made with reference to the drawings, of which:

FIG. 1 is a drawing showing the principle of a microsystem for converting a difference of pressures in a fluid into a mechanical movement, FIG. 2 is a graph showing the movement of the arms of the microsystem of FIG. 1 as a function of time, FIG. 3 is a schematic drawing of the working of the microsystem of FIG. 1, FIG. 4 is a schematic drawing of a possible embodiment of the microsystem of FIG. 1, FIG. 5 is a flowchart of a method for manufacturing the microsystem of FIG. 1, FIGS. 6 to 8 are schematic drawings in section of the different steps of the method of manufacture of the microsystem of FIG. 1, FIG. 9 is a schematic drawing of a sensor of a difference of pressures incorporating the microsystem of FIG. 1, FIG. 10 is a partial view in section of a wheel incorporating the sensor of FIG. 9, FIG. 11 is a schematic drawing in section of a valve of the wheel of FIG. 10, FIG. 12 is a schematic drawing of a fuel cell incorporating a micromotor using the microsystem of FIG. 1, and FIG. 13 is a schematic drawing in section of an electronic chip incorporating a compression microsystem similar to the microsystem of FIG. 1.

In these figures, the same references are used to designate the same elements.

Here below in this description, the characteristics and functions well known to those skilled in the art are not described in detail.

FIG. 1 represents a microsystem for converting a difference in pressures in a fluid into a mechanical movement. The fluid is a compressible fluid. For example, the fluid is a gas.

The microsystem 2 has a closed chamber 4 fluidly connected to the compressed fluid by means of an inlet nozzle 6 and fluidly connected to the expanded fluid by means of an outlet nozzle 8. The chamber 4 is hermetically sealed so that the expanded fluid in this chamber cannot escape by ways other than the nozzle 8.

Within the chamber 4, the nozzle is fluidly connected to a expander 10 using rollers. This is known as a "scroll" expander.

The expander 10 is formed by two arms 12 and 14 movable relatively to each other. The arms 12 and 14 are formed and movable so that, when they move under the effect of the fluid allowed in by the nozzle 6, they define at least one pocket of fluid that moves away from the nozzle 6 and then moves closer to the nozzle 8 while at the same time increasing in volume. For example, the arms 12 and 14 are shaped as spirals and are imbricated with one another. Each spiral has at least one or even more turns to define several pockets of fluid that move at the same time from the nozzle 6 to the nozzle 8. Each arm is mechanically connected by means of respective connections 16 and 18 to a fixed plane 20 (FIG. 4). To simplify FIG. 1, only the points of anchoring 21 to the plane 20 are shown in this figure. The plane 20 extends in parallel to orthogonal directions X and Y. Preferably, the connections 16 and 18 are elastic. The plane 20 retains fluid between the arms 12, 14 while at the same time enabling the arms 12, 14 to move along its upper face. To this end, there is a clearance between the upper face of the plane 20 and the arms 12, 14. This clearance is narrow enough to limit leakage of fluid through it.

An upper plane (not shown) is positioned similarly on the other side of the arms 12, 14 to retain the fluid between the arms 12, 14 while at the same time enabling the arms 12, 14 to move along its lower face.

The connections 16 and 18 enable only a movement in translation of the arms 12 and 14 along the directions Y and X respectively.

Each arm 12, 14 is also mechanically connected to a respective electromechanical transducer 22, 24. Each electromechanical transducer is capable of converting the mechanical motion of the arm into electrical energy.

For example, each of the transducers 22, 24 is connected at output to an electrical energy storage device 26. For example, the device 26 is a capacitor.

The transducers 22 and 24 are electromechanical transducers controllable so as to regulate the quantity of mechanical energy converted into electrical energy. They therefore also fulfill the function of a controllable damping device.

These transducers 22 and 24 are controlled by a control unit 28. The unit 28 is connected to sensors 30 and 32 of a physical value representing the electrical power produced, respectively by the transducers 24 and 22. The sensors 30 and 32 can also be used to measure the phase of the electrical power produced.

A mechanical phase-shifter 36 is mechanically connected between the arms 12 and 14. This phase-shifter has the function of mechanically assisting in the obtaining of a $\pi/2$ radian phase shift between the oscillatory (to-and-fro) motions of the arms 12 and 14. Furthermore, this phase-shifter 36 is formed by a spring 38 mechanically connected to the arms 12 and 14. For example, this spring 38 is a leaf spring. This spring 38 converts the system formed by the two arms 12 and 14 and the spring 38 into a system that is resonant for a resonance frequency. The resonance frequency is attained when the phase shift between the oscillatory motions of the arms 12, 14 is a $\pi/2$ radian shift. At the resonance frequency, the energy efficiency of the microsystem is at the maximum.

The unit 28 is capable of commanding the transducers 22 and 24 to work at the resonance frequency. For example, on the basis of the information measured by the sensors 30 and 32, the unit 28 computes the phase shift between the oscillatory motions of the arms 12 and 14 and sets up an automatic feedback control over the phase shift by the value $\pi/2$.

To limit the energy consumed by the microsystem 2 during its operation, the unit 28 is itself powered with the electrical energy produced by the transducers 22 and 24. To this end for example, the unit 28 is electrically connected to the electrical energy storage device 26.

FIG. 2 shows the progress in time of the movements of the arms 12 and 14 respectively along the directions Y and X. More specifically, the curves 44 and 46 represent the movements respectively of the arms 12 and 14. These movements are sinusoidal and phase-shifted relatively to each other by $\pi/2$ radians.

In a stationary mode, each arm describes an oscillatory or to-and-fro motion between two extreme positions denoted as $X_{max}$ and $X_{min}$ for the arm 14 and $Y_{max}$ and $Y_{min}$ for the arm 12 in FIG. 2.

The movement of the arms 12, 14 defines several pockets of fluid which move circularly from the nozzle 6 to the nozzle 8, increasing in volume. More specifically, each pocket of fluid moves in rotating around the nozzle 6 and at the same time in moving away from it.

FIG. 3 gives a more detailed view of the movement of a pocket 50 of fluid from the nozzle 6 to the nozzle 8.

Initially (state I), the pocket 50 is in fluid communication with the nozzle 6. This pocket 50 then gets filled with a compressed fluid. Then (state II), the arms 12 and 14 move relatively to one another to fluidly isolate this pocket 50 from the nozzle 6.

Then, as illustrated by the successive states (state III to state VI), the pocket 50 moves from the nozzle 6 to the nozzle 8 in describing a spiral motion about the nozzle 6. More specifically, after the arms 12 and 14 have each performed a complete to-and-fro motion, the pocket 50 passes from the positions shown in the state I to the position 52 shown in the state I. It has therefore completed a full rotation about the nozzle 6.

Here, since the spiral-shaped arms 12 and 14 are wound several times around the nozzle 6, at the next oscillatory cycle of the arms 12 and 14, the pocket 50 performs a new rotation about the nozzle 6 but in moving away slightly further from this nozzle 6. More specifically, after another full turn, the pocket 50 occupies the position 54 (state I). Finally, at its last turn, the pocket 50 occupies the position 56 (state I). In the state 56, the pocket is in fluid communication with the nozzle 8 thus enabling the expanded fluid to escape.

Here, the arms 12 and 14 are shaped so as to simultaneously define at least two pockets that move at the same time from the nozzle 6 to the nozzle 8 while increasing in volume. In the particular case shown in FIG. 3, the arms 12 and 14 are shaped to define six pockets of fluid that move simultaneously from the nozzle 6 to the nozzle 8.

It can therefore be understood that, when the fluid expands in the expander 10, the energy of this expansion is converted into a mechanical movement of the arms 12 and 14. In the particular case shown in FIG. 1, this mechanical movement is converted by the transducers 22 and 24 into electrical energy.

FIG. 4 shows a possible example of implementation of the microsystem 2.

For example, except for the positions, the connection 16 and the transducer 22 are identical with the connection 18 and the transducer 24. Thus, only the connection 16 and the transducer 22 are described here in greater detail.

The connection 16 is made here by means of a parallelogram 60 fixed without any degree of freedom to the arm 12. This parallelogram 60 shifts therefore in translation along the direction Y in parallel to the plane 20. The parallelogram 60 is mechanically connected to the plane 20 by means of beams 62. Each beam 62 has one end fixed without any degree of freedom to the parallelogram 60 and the other end fixed to the anchoring point 21 itself fixed without any degree of freedom to the plane 20. The beam 62 is not directly fixed to the plane 20. Preferably, each beam 62 extends in parallel to the direction X. Furthermore, each beam 62 is thin enough to be able to get twisted when the fluid expands in the pockets defined between the arms 12 and 14. Through this configuration, the arm 12 can shift solely along the direction Y.

The transducer 22 uses for example a variable-capacitance capacitor to convert the mechanical energy produced by the movement of the arm 12 into electrical energy. The conversion of mechanical energy into electrical energy by means of variable capacitors is well known. For example, this is described in the patent applications WO2007 082 894 and FR2 897 486. Thus, this conversion mechanism shall not be described in detail. Here, the capacitor is made by means of interdigitated combs. More specifically, one capacitor plate 66 of the capacitor is fixed without any degree of freedom to the parallelogram 60. The other capacitor plate 68 of this capacitor is fixed without any degree of freedom to the plane 20. Thus, when the parallelogram 60 moves, it modifies the capacitance of the capacitor, which is then used to convert the mechanical energy into electrical energy. Preferably, at least one of the capacitor plates of the capacitor has electrets. Indeed, this enables the transducer 22 to start producing electrical energy without any preliminary additional input of electrical energy from an external electrical energy source.

One example of the method of manufacture of the microsystem 2 shall now be described with reference to the method of FIG. 5 and by means of the illustrations of FIGS. 6 to 8.

Initially, at a step 80, a plate comprising a sacrificial intermediate layer 82 is etched. Typically, this plate is an SOI (silicon-on-insulator) plate. Thus, in addition to the sacrificial layer 82, this plate comprises on the one hand a silicon layer 84 and on the other hand a layer of insulator 86. At the step 80, the spirals, the connections and the variable-capacitance capacitor are simultaneously etched in the layer 84. In FIG. 6, the microsystem thus etched is represented by a block 90. The block 90 lies on the layer 82.

Then, at a step 92, the layer 82 situated beneath the block 90 is eliminated. For example, chemical etching is used to eliminate the sacrificial layer. From this instant onwards, the spirals 12 and 14 and the parallelograms of the connections as well as the plate 66 of the variable-capacitance capacitors can move in translation relatively to the plane 20 constituted by the upper face of the layer 86 (see FIG. 7).

Then, at a step 94, a cap 96 is made and this cap is fitted above the layer 84. This cap 96 constitutes the upper plane designed to confine the fluid between the arms 12, 14. For example, the cap 96 is made out of glass. The nozzles 6 and 8 are made in this cap 96. Only the nozzle 6 has been shown in FIG. 8.

Holes providing access to the layer 84 are also made in the cap 96 to electrically connect the transducers 22 and 24 to the control unit 28 and to the energy storage device 26. In FIG. 8, only one access hole 98 to the layer 84 has been shown.

Figure 6:
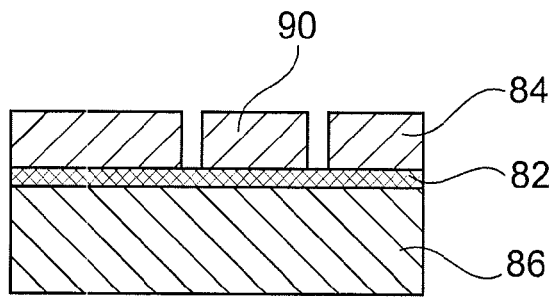

It will be noted that the thickness of the layer 82 as well as the space between the cap 96 and the block 90 have been exaggerated in FIGS. 6 to 8 to make visible the clearance between the arms 12, 14 and the lower or upper plane respectively. In practice, the thickness of the layer 22 and the space between the cap 96 and the block 90 are small enough for the fluid, expanding in the expander 10, to remain confined between the arms 12 and 14.

The microsystem 2 has numerous possible applications.

For example FIG. 9 shows a sensor 100 of difference in pressures, made from the microsystem 2. Indeed, the difference in pressures between the nozzles 6 and 8 is proportional to the mechanical energy produced by the movement of the arms 12 and 14. Furthermore, since the electrical energy produced by the transducers 22 and 24 is proportional to the mechanical energy received, this electrical energy is also proportional to the difference in pressures between the nozzles 6 and 8. It is this property of the microsystem 2 that is used to make the sensor 100.

The sensor 100 comprises the energy storage device 26, the control unit 28 and the microsystem 2. It furthermore has a circuit 102 for managing the charging and discharging of the device 6 and a radio transmitter 104 capable of communicating a piece of information representing the difference in pressures between the nozzles 6 and 8 to a remote radio receiver.

For example, the circuit 100 activates the sending of a characteristic signal through the transmitter 104 as soon as the load of the device 26 goes beyond a predetermined threshold $F_1$. Thus, the time that elapses between two transmissions is proportional to the measured difference in pressures. It is therefore possible, from the data received, to deduce the difference in pressures between the nozzles 6 and 8.

Here, the threshold $F_1$ is set so as to enable the powering of the transmitter 104 so that it transmits the characteristic pulse. Thus, in this embodiment, the sensor 100 does not need any external power source to work. Indeed, the only energy source it uses is the difference in pressures existing between the nozzles 6 and 8.

FIG. 10 shows a wheel 110 equipped with the sensor 100. The wheel 110 has a tire 112 within which compressed air is confined. This tire 112 is mounted on a wheel rim 114. The sensor 100 is placed within the tire 112 which acts as a protective casing for it.

To work, the nozzle 8 must be fluidly connected to the exterior of the tire 112.

FIG. 11 shows a possible example of the mounting of the sensor 100 inside the tire 112 in order to achieve this. More specifically, the tire 112 has a valve stem 116 through which the wheel 110 can be inflated. Classically, this valve stem consists of a sleeve 118 fixed without any degree of freedom to the tire 112 and a mobile check valve 120. This check valve 120 can be shifted between an idle position in which it hermetically seals the tire and an active position in which it enables compressed air to be introduced into the tire 112.

Here, a hole 124 is made through the check valve 120 to enable the passage of the nozzle through this check valve 120 and thus connect it to the outside air.

In this embodiment, the sensor 100 is fixed without any degree of freedom to the check valve 120.

Thus, when the check valve 120 is in its idle position, the compressed air leaks through the sensor 100 and the hole 124. The flow rate of the leakage of air is very low, i.e. below 1 mL/s. For example here, the hole 124 is sized so as to enable a leakage of air only below 100 μL/s and preferably below or equal to 10 μL/s.

With a flow rate of 100 μL/s, the leakage that occurs through the valve 120 represents, for a tire with a volume of air equal to $3.94 \times 10^{-2}$ m$^3$, a drop in pressure of 8 mBars at the end of six months, which is negligible. Thus, the sensor 100 is capable of working for more than six months without in any way requiring the owner of the vehicle to re-inflate the tire 110.

FIG. 12 shows a fuel cell 130 equipped with a micromotor incorporating the microsystem 2. The micromotor also incorporates a compression microsystem 132. For example, this microsystem 132 is identical to the microsystem 2 except that it is commanded to compress an expanded fluid admitted by a nozzle 133. Indeed, the working of the microsystem 2 is reversible. In particular, in this mode of operation, the transducers 22 and 24 are used to convert electrical energy provided for example through the device 26 into mechanical movements of the arms 12 and 14. Thus, it is also ensured that the movements in terms of to-and-fro motions of the arms 12 and 14 are phase-shifted by π/2. The expanded fluid is then let in by the nozzle 133 corresponding to the nozzle 8 and the compressed fluid is expelled by the nozzle 6.

The fluid compressed by the microsystem 132 is expelled into a combustion chamber 134 of the micromotor. Here, the compressed fluid is an inflammable mixture of fuel and comburant. In the chamber 134, this inflammable mixture explodes, producing exhaust gases which are even more compressed. The exhaust gases are then admitted through the nozzle 6 into the microsystem 2 which converts the difference in pressures thus created into a mechanical motion and then into electrical energy. The electrical energy is then used to power a load connected to the terminals of the fuel cell. This load is not shown. The expanded exhaust gases are expelled through the nozzle 8.

FIG. 13 shows an electronic chip 140 equipped with microchannels 142 made inside the substrate which supports electronic components 144 such as transistors. The microchannels 142 have an input mouth 146 and an output mouth 148. A heat-transfer fluid 148 flows from the mouth 146 to the mouth 148.

In this embodiment, a microsystem 150 for compressing heat-transfer fluid is connected between the mouths 146 and 148. This microsystem 150 is for example identical to the microsystem 132.

The microchannels 142 form an expansion vase so that the compressed heat-transfer fluid expelled by the microsystem 150 into the mouth 146 expands in the microchannels, thus enabling the electronic components to be cooled. Then, this heat-transfer fluid returns to the microsystem 150 by means of the mouth 148 where it is again compressed.

Thus, the electronic chip 140 can be cooled efficiently and simply.

Many other embodiments are possible. For example, the arms 12 and 14 can be mechanically pre-stressed so that, whatever the position of these arms, there is always at least one elastic connection which has a non-zero elongation, i.e. it is not in its position of rest.

Various different forms of spirals are possible for the arms 12 and 14. For example, the shape may be that of a volute or an Archimedean screw. Each arm may have one or more spirals.

As a variant, one of the arms is fixed without any degree of freedom to the substrate and only the other arm moves so as to move one or more pockets of fluid identically to what was described with reference to FIG. 3. For example, the fixed arm is made by etching a layer deposited on the substrate but not on a sacrificial layer as is the case for the mobile arm.

Other embodiments are possible for the connections 16 and 18. For example, the connections 16 and 18 may be made by means of a flexible blade, a ball joint, a slide bearing or the like and a combination of these elements.

The compressed fluid may or may not come from combustion. In the latter case, the compressed fluid may come from a reservoir of compressed fluid. For example, in the embodiment of FIG. 12, the microsystem 132 and the combustion chamber 134 are replaced by a reservoir of compressed fluid. Thus, a cell is obtained generating electricity from the expansion of compressed fluid stored in the reservoir. Preferably, all the components of the cells described here are housed in a same pack from which there emerge electrical connection terminals for connection to an external electrical circuit. Typically, this pack is detachable to enable easy replacement of the cell in the external electrical circuit. These terminals are therefore capable of cooperating with corresponding electrical terminals of the external electrical circuit so as to be electrically connected to and, alternately, disconnected from this circuit.

It is not necessary for the arms 12 and 14 to be mounted in translation along perpendicular axes. Indeed, it is enough for the axes along which the arms 12 and 14 move to be not parallel. If the angle between these axes is different from π/2 radians, then the phase shift between the oscillatory motions of the arms 12 and 14 must be adapted accordingly.

Nor is it necessary for the arms 12 and 14 to work at the resonance frequency.

In one simplified embodiment, the mechanical phase-shifter 36 can be omitted. In this case, the predetermined phase shift between the motions of the arms can be achieved by an electrical actuator, for example an electromechanical transducer.

The mechanical phase shift can also be made without using a spring. For example, it can be made by means of a rod-and-crank mechanism.

For the conversion of a difference in pressures into a mechanical motion, the conversion of the mechanical energy thus produced into electrical energy is optional. Indeed, for the system 2 to work, it is enough to have controllable dampers enabling automatic feedback control over the movements of the arms 12 and 14 to maintain an appropriate phase shift.

The electrical energy produced from the movements of the arms 12 and 14 is not necessarily used to power the unit 28 or other associated electronic components such as the components of the sensor 100.

Many other modes of manufacturing the microsystem 2 are possible. In particular, the etching steps can be replaced by steps of deposition. Similarly, the use of a sacrificial layer can be omitted. In this case, other steps are implemented for manufacturing the two mutually imbricated arms simultaneously. For example, the two arms are manufactured by hollowing out via slots in one and the same substrate, these slots defining these arms and the space between these arms. One end of each arm is left fixed to the substrate. Plates are then hermetically bonded to each face of the substrate to seal the cavity in which the liquid expands between the arms or is compressed between the arms.

Finally, in the embodiments of the sensors, electronic chips, micromotors and cells described here above, the microsystem 2 can be replaced by another microsystem for converting the difference in pressures in a fluid into a mechanical movement or vice versa. For example, the microsystem 2 is replaced by a microsystem comprising a turbine to convert the difference in pressure into a mechanical movement.

The invention claimed is:

1. An apparatus for converting a difference in pressures into a mechanical movement, said apparatus comprising a microsystem having: an inlet nozzle for compressed fluid, an outlet nozzle for expanded fluid, and at least two arms directly connected to an upper plane, at least one of said arms being movable, wherein, while passing from said inlet nozzle to said outlet nozzle, fluid flows between said arms and moves at least one of said arms relative to another of said arms, wherein, said arms are configured to define, in motion, a pocket of fluid that moves away from said inlet nozzle and toward said outlet nozzle, and wherein said pocket of fluid increases in volume as it proceeds from said inlet nozzle to said outlet nozzle.

2. The apparatus of claim 1, further comprising a transducer for converting mechanical energy produced by movement of said arms into another form of energy.

3. The apparatus of claim 1, wherein said arms are formed into spirals imbricated with each other.

4. The apparatus of claim 1, wherein each of said arms is mechanically connected to said plane by a connection that enables only to-and-fro movement in translation of each arm parallel to said plane and along non-collinear directions.

5. The apparatus of claim 4, further comprising a mechanical phase-shifter interposed between said arms to introduce a phase-shift between said to-and-fro movements of said arms.

6. The apparatus of claim 1, further comprising: at least one link between said arms capable of converting said arms into a system resonating at a resonance frequency, and a unit for controlling movement of said arms, said unit exercising automatic feedback control over said frequency of said to-and-fro motions of said arms to enslave said arms to said resonance frequency.

7. The apparatus of claim 6, wherein said link comprises a spring having ends, each of which mechanically connects to one of said arms.

8. The apparatus of claim 1, further comprising a lower plane, wherein said arms are interposed between said upper and lower planes, said planes confining, between said arms, said flowing fluid, wherein said arms are configured to be movable relative to each of said upper and lower planes.

9. The apparatus of claim 1, wherein said inlet and outlet nozzles are fluidly connected to said compressed and expanded fluids, said apparatus further comprising a transducer capable of converting mechanical energy of movement of said arms under action of said fluid, which expands in flowing from said inlet nozzle to said outlet nozzle, into a physical quantity representing said difference in pressures, and a wireless transmitter for transmitting a value representative of said difference in pressures, whereby said apparatus functions as a sensor for sensing a difference in pressures between a compressed fluid and an expanded fluid.

10. The apparatus of claim 9, wherein said transducer comprises an electromechanical transducer capable of converting mechanical energy of said movement of said arms into electrical energy used to power said sensor.

11. The apparatus of claim 1, further comprising a channel for intake of an inflammable mixture of fuel and comburant, and wherein said micro-system is configured to compress said mixture before combustion or to expand exhaust gases resulting from combustion of said mixture, whereby said apparatus functions as a combustion micro-motor.

12. The apparatus of claim 11, further comprising: a fuel cell, and an electromechanical transducer for converting mechanical movement resulting from combustion of a mixture of carburant and comburant in said combustion micro-motor into electrical energy for supplying an electrical load connected said fuel cell.

13. The apparatus of claim 1, further comprising a cell; and a reservoir of compressed fluid, wherein said micro-system in which said inlet and outlet nozzles are fluidly connected to said compressed and expanded fluids is configured to convert expansion of said compressed fluid into mechanical movement, said apparatus further comprising an electromechanical transducer capable of converting said mechanical movement into electrical energy for powering an electrical load connected to said cell.

14. An apparatus for compressing a fluid, said apparatus comprising a micro-system including: an inlet nozzle for an expanded fluid, an outlet nozzle for compressed fluid, at least two arms directly connected to an upper plane, at least one of said arms being movable, and an actuator for moving said arms, wherein, in response to mechanical movement of said arms relative to each other, fluid flows between said arms while passing from said inlet nozzle to said outlet nozzle, and wherein said arms are formed and actuated so that, during their movement, said arms define at least one pocket of fluid that diminishes in volume while moving away from said inlet nozzle toward said outlet nozzle.

15. The apparatus of claim 14, wherein said arms are formed into spirals imbricated with each other.

16. The apparatus of claim 14, wherein each of said arms is mechanically connected to said plane by a connection that enables only to-and-fro movement in translation of each arm parallel to said plane and along non-collinear directions.

17. The apparatus of claim 16, further comprising a mechanical phase-shifter interposed between said arms to introduce a phase-shift between said to-and-fro movements of said arms.

18. The apparatus of claim 14, further comprising: at least one link between said arms capable of converting said arms into a system resonating at a resonance frequency, and a unit for controlling movement of said arms, said unit exercising automatic feedback control over said frequency of said to-and-fro motions of said arms to enslave said arms to said resonance frequency.

19. The apparatus of claim 18, wherein said link comprises a spring having ends, each of which mechanically connects to one of said arms.

20. The apparatus of claim 14, further comprising a lower plane, wherein said arms are interposed between said upper and lower planes, said planes confining, between said arms, said flowing fluid, wherein said arms are configured to be movable relative to each of said upper and lower planes.

21. The apparatus of claim 14, further comprising an electronic chip that includes said micro-system; and a network of micro channels through which a compressible heat-transfer fluid flows for cooling said electronic chip, said micro channels extending between an inlet opening and an outlet opening in said thickness of said electronic chip, wherein said inlet and outlet nozzles are fluidly connected respectively to said inlet opening and said outlet opening of said micro channels, whereby said micro channels form an expander.

22. The apparatus of claim 14, further comprising a channel for intake of an inflammable mixture of fuel and comburant, wherein said micro-system is configured to compress said mixture before combustion or to expand exhaust gases resulting from combustion of said mixture, and wherein said apparatus functions as a combustion micro-motor.

23. A method of manufacturing a micro-system a micro-system having: an inlet nozzle for compressed fluid, an outlet nozzle for expanded fluid, and at least two arms directly connected to an upper plane, at least one of said arms being movable, wherein, while passing from said inlet nozzle to said outlet nozzle, fluid flows between said arms and moves at least one of said arms relative to another of said arms, wherein, said arms are configured to define, in motion, a pocket of fluid that moves away from said inlet nozzle and toward said outlet nozzle, and wherein said pocket of fluid increases in volume as it proceeds from said inlet nozzle to said outlet nozzle, said method comprising simultaneously depositing or etching, on a substrate, arms imbricated with one another.

24. The apparatus of claim 1, further comprising a lower plane, wherein said arms are interposed between said upper and lower planes, said planes confining, between said arms, said flowing fluid, wherein said at least two arms are mechanically connected to said lower plane and are movable along a lower face of said upper plane.

25. The apparatus of claim 24, wherein the arms are positioned such that there exists a clearance between said upper plane and said two arms, said clearance being selected to enable flowing fluid to remain confined between said arms.

26. The apparatus of claim 24, wherein said upper and lower planes are fixed.

27. The apparatus of claim 24, wherein said two arms are mechanically connected to the lower plane and wherein said two arms are movable along an upper face of the lower plane.

28. The apparatus of claim 14, further comprising a lower plane, wherein said arms are interposed between said upper and lower planes, said planes confining, between said arms, said flowing fluid, wherein said at least two arms are mechanically connected to said lower plane and are movable along a lower face of said upper plane.

29. The apparatus of claim 28, wherein the arms are positioned such that there exists a clearance between said upper plane and said two arms, said clearance being selected to enable flowing fluid to remain confined between said arms.

30. The apparatus of claim 28, wherein said upper and lower planes are fixed.

31. The apparatus of claim 28, wherein said two arms are mechanically connected to the lower plane and wherein said two arms are movable along an upper face of the lower plane.

* * * * *